(12) United States Patent
Lee et al.

(10) Patent No.: US 11,075,373 B2
(45) Date of Patent: Jul. 27, 2021

(54) POSITIVE ELECTRODE FOR METAL SECONDARY BATTERY AND METAL SECONDARY BATTERY INCLUDING THE SAME

(71) Applicants: Samsung Electronics Co., Ltd., Suwon-si (KR); Samsung SDI Co., Ltd., Yongin-si (KR)

(72) Inventors: Dongjin Lee, Suwon-si (KR); Joonseon Jeong, Seoul (KR); Chansu Kim, Seoul (KR); Yooseong Yang, Yongin-si (KR); Taehwan Yu, Seongnam-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 330 days.

(21) Appl. No.: 15/787,149

(22) Filed: Oct. 18, 2017

(65) Prior Publication Data

US 2018/0114976 A1 Apr. 26, 2018

(30) Foreign Application Priority Data

Oct. 24, 2016 (KR) .................. 10-2016-0138640

(51) Int. Cl.
*H01M 4/136* (2010.01)
*H01M 4/62* (2006.01)
(Continued)

(52) U.S. Cl.
CPC ........... *H01M 4/136* (2013.01); *H01M 4/622* (2013.01); *H01M 10/0525* (2013.01);
(Continued)

(58) Field of Classification Search
CPC ...... H01M 4/136; H01M 4/622; H01M 4/134; H01M 10/0525; H01M 2004/028; C01D 15/00; C08G 63/06; G01N 23/20075
See application file for complete search history.

(56) References Cited

U.S. PATENT DOCUMENTS

2002/0100725 A1 8/2002 Lee et al.
2014/0178756 A1 6/2014 Ishii et al.
(Continued)

FOREIGN PATENT DOCUMENTS

EP 1249882 A1 10/2002
EP 2787564 A1 10/2014
(Continued)

OTHER PUBLICATIONS

European Serach Report for European Patent Application No. 17197639.2 dated Jan. 3, 2018.

*Primary Examiner* — Laura Weiner
(74) *Attorney, Agent, or Firm* — Cantor Colburn LLP

(57) ABSTRACT

A positive electrode for a metal secondary battery includes a positive current collector; and a positive active material layer disposed on the positive current collector, wherein the positive active material layer includes: a positive active material, a salt including an alkali metal salt, an alkaline earth metal salts, or a combination thereof, and a polymeric first binder including a repeating unit represented by Formula 1

Formula 1

(Continued)

wherein R is a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or a combination thereof, and n is an integer from 90 to 2,700. Also a metal secondary battery including the same.

21 Claims, 11 Drawing Sheets

(51) Int. Cl.
  *H01M 10/0525* (2010.01)
  *H01M 4/134* (2010.01)
  *C01D 15/00* (2006.01)
  *C08G 63/06* (2006.01)
  *G01N 23/20* (2018.01)
  *H01M 4/02* (2006.01)

(52) U.S. Cl.
  CPC .............. *C01D 15/00* (2013.01); *C08G 63/06* (2013.01); *G01N 23/20075* (2013.01); *H01M 4/134* (2013.01); *H01M 2004/028* (2013.01)

(56) References Cited

U.S. PATENT DOCUMENTS

| 2015/0140425 A1* | 5/2015 | Cyman, Jr. ....... H01M 10/0565 |
| | | 429/231.95 |
| 2016/0248086 A1* | 8/2016 | Ohsawa ................ H01M 4/621 |

FOREIGN PATENT DOCUMENTS

| JP | 2010-97817 | * | 4/2010 |
| KR | 20020063020 A | | 8/2002 |
| KR | 1020040000129 A | | 1/2004 |
| KR | 1020070008405 A | | 1/2007 |
| KR | 1020100036136 A | | 4/2010 |
| WO | WO 2015-053200 | * | 4/2015 |
| WO | WO 2015-147282 | * | 10/2015 |

* cited by examiner

POSITIVE ELECTRODE FOR METAL SECONDARY BATTERY AND METAL SECONDARY BATTERY INCLUDING THE SAME

CROSS-REFERENCE TO RELATED APPLICATION

This application claims priority to and the benefit of Korean Patent Application No. 10-2016-0138640, filed on Oct. 24, 2016, in the Korean Intellectual Property Office, and all the benefits accruing therefrom under 35 U.S.C. § 119, the content of which is incorporated herein in its entirety by reference.

BACKGROUND

1. Field

The present disclosure relates a positive electrode for a metal secondary battery and a metal secondary battery including the same.

2. Description of the Related Art

Due to recent issues regarding the occurrence of explosions in mobile phones and/or electric vehicles, the safety of secondary batteries has received considerable attention.

Secondary batteries using a liquid electrolyte may not have long-term stability due to flammability of the liquid electrolyte, despite high energy density thereof. Secondary batteries using a gel electrolyte or a solid electrolyte instead of the liquid electrolyte have drawn attention as ways of providing secondary batteries having long-term stability.

A gel electrolyte may include poly(vinylidene fluoride-co-hexafluoropropene) (PVDF-HFP) and may be prepared by gelling a liquid electrolyte. As a solid electrolyte, polymer electrolytes and inorganic electrolytes have been used. An example of a polymer electrolyte is polyethylene oxide. Also, LiPON, $Li_{1.5}Al_{0.5}Ti_{1.5}(PO_4)_3$ (LATP), and $Li_{1.5}Al_{0.5}Ge_{1.5}(PO_4)_3$ (LAGP) have each been used as an inorganic electrolyte.

However, although secondary batteries including such gel electrolytes or solid electrolytes have high stability, electrochemical properties thereof, such as initial charge/discharge capacity, charge/discharge efficiency, and lifespan characteristics may deteriorate.

Thus, there is still a need to develop a positive electrode, an electrolyte, and a secondary battery including the same having improved electrochemical properties.

SUMMARY

Provided is a positive electrode for a metal secondary battery including a positive active material layer including a positive active material, a salt including an alkali metal salt, an alkaline earth metal salt, or a combination thereof, and a polymeric first binder including a repeating unit represented by Formula 1.

Provided is a metal secondary battery including the positive electrode.

Additional aspects will be set forth in part in the description which follows and, in part, will be apparent from the description, or may be learned by practice of the presented embodiments.

According to an aspect, a positive electrode for a metal secondary battery includes a positive current collector; and a positive active material layer disposed on the positive current collector, wherein the positive active material layer includes: a positive active material, a salt comprising an alkali metal salt, an alkaline earth metal salt, or a combination thereof, and a polymeric first binder including a repeating unit represented by Formula 1

Formula 1

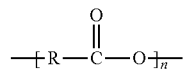

wherein R is a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or a combination thereof, and n is an integer from 90 to 2,700.

According to another aspect, a metal secondary battery includes a negative electrode including lithium metal or a lithium alloy, the positive electrode, and an electrolyte membrane or separator interposed between the negative electrode and the positive electrode.

Also disclosed is a method of preparing a positive electrode for metal secondary battery, the method including providing a positive current collector; and disposing a positive active material layer on the positive current collector, wherein the positive active material layer includes: a positive active material, a salt including an alkali metal salt, an alkaline earth metal salt, or a combination thereof, and a polymeric first binder including a repeating unit represented by Formula 1:

Formula 1

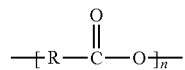

wherein R is a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or a combination thereof, and n is an integer from 90 to 2,700.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
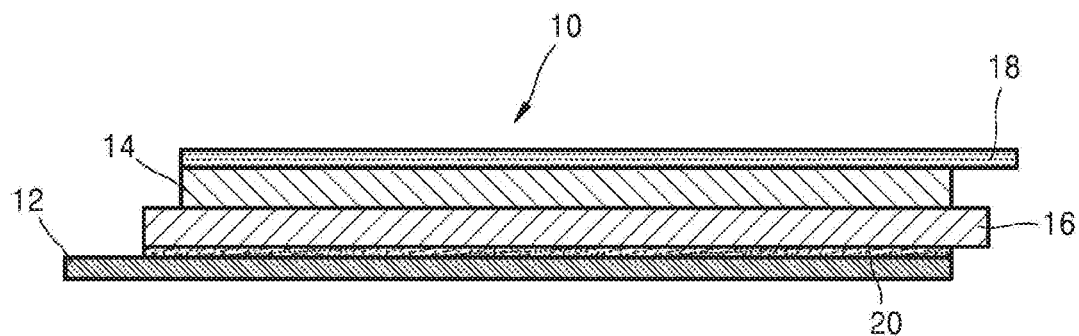
FIG. 1 is a schematic diagram of an embodiment of a lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Thus the term "includes" in relation to an element does not preclude other elements but may further include another element, unless stated otherwise.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time of 1 h, e.g., a C rate for a battery having a discharge capacity of 1.6 ampere-hours would be 1.6 amperes.

Hereinafter, a positive electrode for a metal secondary battery and a metal secondary battery including the same according to embodiments will be disclosed in further detail.

A positive electrode for a metal secondary battery according to an embodiment includes a positive current collector and a positive active material layer disposed on the positive current collector. The positive active material layer may include a positive active material, a salt comprising an alkali metal salt, an alkaline earth metal salt, or a combination thereof, and a polymeric first binder including a repeating unit represented by Formula 1.

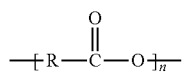

Formula 1

In Formula 1, R may be a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or a combination thereof, and n may be an integer from 90 to 2,700.

For example, the polymeric first binder including the repeating unit represented by Formula 1 may have a number average molecular weight (Mn) of about 10,000 Daltons (Da) to about 300,000 Da, about 20,000 Da to about 250,000 Da, or about 30,000 Da to about 200,000 Da.

The polymeric first binder including the repeating unit represented by Formula 1 may enhance adhesiveness of the positive active material layer to the positive current collector in the positive electrode. Thus, interfacial contact resistance between the positive electrode and an electrolyte may be reduced and a metal secondary battery including the same may have improved electrochemical properties, e.g., improved initial charge/discharge capacity, charge/discharge efficiency, and lifespan characteristics.

Hereinafter, substituents used in Formula 1 are defined as follows.

The term "substituted" used in the alkylene group, the alkoxylene group, the alkoxycarbonylene group, or the alkylene oxide group of Formula 1 indicates that at least one hydrogen atom of these groups is substituted with a halogen atom, a C1-C20 alkyl group substituted with a halogen atom (e.g., —CF$_3$, —CHF$_2$, —CH$_2$F, and —CCl$_3$), a hydroxyl group, a nitro group, a cyano group, an amino group, an amidino group, a hydrazine group, a hydrazone group, a carboxylic acid group and a salt thereof, a benzylcarboxylic acid group and a salt thereof, a sulfonic acid group and a salt thereof, a phosphoric acid group and a salt thereof, a C1-C20 alkyl group, a C2-C20 alkenyl group, a C2-C20 alkynyl group, a C3-C20 cycloalkyl group, a C6-C20 aryl group, a C6-C20 heteroaryl group, a C7-C20 arylalkyl group, or a C6-C20 heteroarylalkyl group.

The term "alkylene group" used in Formula 1 refers to a completely saturated, branched or unbranched (or straight-chain or linear) divalent hydrocarbon group.

Examples of the "alkylene group" may include methylene (—CH$_2$—), ethylene (—CH$_2$CH$_2$—), n-propylene, isopropylene, n-butylene, isobutylene, sec-butylene, n-pentylene, isopentylene, neo-pentylene, 2,2-dimethylpentylene, and 2,3-dimethylpentylene, without being limited thereto, and when substituted at least one hydrogen atom of the alkylene group may be substituted with a substituent as defined above.

The term "alkoxylene group" used in Formula 1 refers to an alkylene group linked to oxygen and further linked to an alkylene group, e.g., a group of the formula —R'—O—R'— wherein each R' is the same.

Examples of the "alkoxylene group" may include methoxylene (—CH$_2$—O—CH$_2$—), ethoxylene (—CH$_2$CH$_2$—O—CH$_2$CH$_2$—), and propoxylene (—C$_3$H$_6$—O—C$_3$H$_6$—), without being limited thereto, and when substituted at least one hydrogen atom of the alkoxylene group may be substituted with a substituent as defined above.

The term "alkoxycarbonylene group" used in Formula 1 refers to a combined group of an alkylene group linked to oxygen and a carbonylene group (—C(=O)—) further linked to an alkylene group, e.g., a group of the formula —R'—O(—C(=O)—R'— or —R'—(—C(=O)—O—R'— wherein each R' is the same.

Examples of the "alkoxycarbonylene group" may include methoxycarbonylene (—CH$_2$—O—C(=O)CH$_2$— or —CH$_2$—C(=O)—O—CH$_2$—), ethoxycarbonylene, and propoxycarbonylene, without being limited thereto, and when substituted at least one hydrogen atom of the alkoxycarbonylene group may be substituted with a substituent as defined above.

The term "alkylene oxide group" used in Formula 1 refers to an alkylene group linked to oxygen, e.g., a group of the formula —R'O—. When R is an alkylene oxide group, the compound of formula 1 is a polycarbonate.

Examples of the "alkylene oxide group" may include ethylene oxide (—CH$_2$CH$_2$—O—), propylene oxide (—C$_3$H$_6$—O—), and butylene oxide, without being limited thereto, and when substituted at least one hydrogen atom of the alkylene oxide group may be substituted with a substituent defined above.

The C2-C20 alkenyl group, used as a substituent, refers to a branched or unbranched hydrocarbon chain having 2 to 20 carbon atoms and at least one carbon-carbon double bond, examples of the C2-C20 alkenyl group may include vinyl and allyl, and examples of the divalent C2-C20 alkenylene groups may include vinylene and allylene.

The C2-C20 alkynyl group, used as a substituent, refers to a branched or unbranched hydrocarbon chain having 2 to 20 carbon atoms and at least one carbon-carbon triple bond, and examples of the C2-C20 alkynyl group may include ethynyl, isobutynyl, and isopropynyl.

The C3-C20 cycloalkyl group, used as a substituent, refers to a saturated ring system of carbon atoms from which one hydrogen atom is removed, and examples of the C3-C20 cycloalkyl group may include cyclopropyl, cyclobutyl, cyclopentyl, and cyclohexyl.

The C6-C20 aryl group, used as the substituent, refers to a carbocyclic aromatic system having at least one ring. Two or more rings may be fused to each other or linked to each other. Examples of the C6-C20 aryl group may include phenyl, naphthyl, and tetrahydronaphthyl.

The C6-C20 heteroaryl group, used as a substituent, refers to an aromatic organic group including a hetero atom, wherein the hetero atom comprises N, O, P, S, or a combination thereof, with the remaining ring atoms being carbon atoms. Examples of the C6-C20 heteroaryl group may include pyridyl.

The C7-C20 arylalkyl group and the C6-C20 heteroarylalkyl group, used as substituents, refer respectively to an aryl group and a heteroaryl group each having an alkyl group, attached via either the aryl (or heteroaryl) or alkyl group (e.g., benzyl or 3-methylphenyl).

For example, in Formula 1, R may comprise an unsubstituted C2-C5 alkylene group, a C2-C5 alkylene group substituted with a methyl group, a C2-C5 alkylene group substituted with a dimethyl group (i.e., two methyl groups substituted on a single carbon atom), a C2-C5 alkylene group substituted with a phenyl group, a C2-C5 alkylene group substituted with a benzyl group, and a C2-C5 alkylene group substituted with a benzylcarboxyl group where either the carbonyl carbon atom or the oxygen atom of the carboxyl group can be attached to the benzyl group.

For example, in Formula 1, R may be a group represented by Formulae 1-1 to 1-13, or a combination thereof.

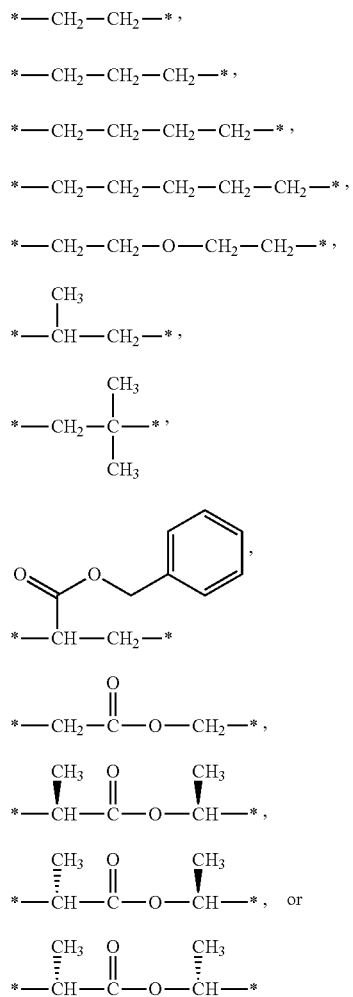

In Formulae 1-1 to 1-13, * is a binding site to a main chain of a polymer of the repeating unit represented by Formula 1.

For example, R may be a group represented by Formulae 1-3 or 1-4 in Formula 1, or a combination thereof. While not wanting to be bound by theory, it is understood that R provides a high degree of dissociation of the alkali metal salts and/or alkaline earth metal salts, a low glass transition temperature Tg, and high conductivity of alkali metal ions and/or alkaline earth metal ions.

For example, in Formula 1, n may be an integer from about 100 to about 1,800, about 200 to about 1,600, about 300 to about 1,400, about 400 to about 1,200, about 500 to about 1,000, or about 600 to about 800. If n is within this range in Formula 1, the binder of the positive electrode for a metal secondary battery has appropriate viscosity without particles thereof being agglomerated, thereby enhancing adhesiveness of the positive active material layer to the positive current collector in the positive electrode. Thus, interfacial contact resistance between the positive electrode and the electrolyte may be reduced, and a metal secondary battery including the same may have improved electrochemical properties, e.g., improved initial charge/discharge capacity, charge/discharge efficiency, and lifespan characteristics.

An amount of the polymeric first binder including the repeating unit represented by Formula 1 may be from about 0.1 parts by weight to about 30 parts by weight, about 1 parts by weight to about 20 parts by weight, or about 2 parts by weight to about 10 parts by weight, based on 100 parts by weight of the positive electrode. When the amount of the polymeric first binder including the repeating unit represented by Formula 1 is in this range, the positive active material of the positive active material layer may have appropriate viscosity in the positive electrode, and the metal secondary battery including the same may have improved electrochemical properties, e.g., improved initial charge/discharge capacity, charge/discharge efficiency, and lifespan characteristics.

The salt may comprise $LiSCN$, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiPF_3(C_2F_5)_3$, $LiPF_3(CF_3)_3$, $LiB(C_2O_4)_2$, $NaSCN$, $NaSO_3CF_3$, $NaN(SO_2CF_3)_2$, $KN(SO_2CF_3)_2$, $Ba(N(SO_2CF_3)_2)_2$, $Ca(N(SO_2CF_3)_2)_2$, or a combination thereof.

For example, the salt may comprise $LiSCN$, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiPF_3(C_2F_5)_3$, $LiPF_3(CF_3)_3$, $LiB(C_2O_4)_2$, or a combination thereof.

The positive electrode including the salt may enhance mobility and ion conductivity of alkali metal ions or alkaline earth metal ions of the metal secondary battery including the positive electrode.

A weight ratio of the polymeric first binder having the repeating unit represented by Formula 1 to salt may be from about 9:1 to about 1:9. For example, the weight ratio of the polymeric first binder including the repeating unit represented by Formula 1 to the salt may be from 8:2 to about 5:5, for example, from 7:3 to about 5:5.

When the weight ratio of the polymeric first binder including the repeating unit represented by Formula 1 to the salt is within these ranges, the alkali metal salt and/or alkaline earth metal salt does not precipitate and has appropriate solubility, thereby enhancing mobility and ion conductivity of alkali metal ions or alkaline earth metal ions. Also, mechanical properties thereof may be maintained.

The positive active material layer may further comprise a second binder, an oligomer, an organic solvent, an ionic liquid, a plasticizer, or a combination thereof.

The second binder may include polyvinylidene difluoride (PVdF), polyvinyl alcohol (PVA), a polyacrylic (C1-C6 alkyl) ester, a vinylidene fluoride-hexafluoro propylene (VDF-HFP) copolymer, chloropolyethylene, a polymethacrylic acid (C1-C6 alkyl) ester, an ethylene-vinyl alcohol copolymer, a polyimide, a polyamide, a polyamideimide, a hydride thereof, a carboxylic acid derivative thereof, or a combination thereof.

An amount of the second binder may be from about 0.1 parts by weight to about 50 parts by weight, about 1 parts by weight to about 25 parts by weight, or about 2 parts by weight to about 10 parts by weight, based on 100 parts by weight of the positive electrode. When the amount of the second binder is within this range, a binding force of the positive active material layer may increase and/or adhesiveness between the positive active material layer and the positive current collector may be enhanced.

The oligomer may comprise poly(ethylene oxide), poly(propylene oxide), poly(butylene oxide), poly(ethylene glycol), poly(ethylene glycol)diacrylate, poly(propylene glycol)diacrylate, poly(ethylene glycol)dimethacrylate, poly(propylene glycol)dimethacrylate, poly(ethylene glycol) urethane diacrylate, poly(ethylene glycol)urethane dimethacrylate, poly(ethylene glycol)urethane triacrylate, poly(ethylene glycol)urethane trimethacrylate, or a combination thereof.

An amount of the oligomer may be from about 0.1 parts by weight to about 50 parts by weight, about 1 parts by weight to about 25 parts by weight, or about 2 parts by weight to about 10 parts by weight, based on 100 parts by weight of the positive electrode. When the amount of the oligomer is within this range, mobility of alkali metal ions and/or alkaline earth metal ions may further be enhanced between the electrolyte and the positive electrode.

The organic solvent may comprise propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, and dimethyl ether. An amount of the organic solvent may be from about 0.1 parts by weight to about 50 parts by weight, about 1 parts by weight to about 25 parts by weight, or about 2 parts by weight to about 10 parts by weight, based on 100 parts by weight of the positive electrode. When the amount of the organic solvent is within this range, conductivity of alkali metal ions and/or alkaline earth metal ions appropriate for performance of a battery may be obtained.

The ionic liquid may be a salt in a liquid state, and may be a molten salt at room temperature composed solely of ions and having a melting point below room temperature.

The ionic liquid may comprise a cation comprising an ammonium, pyrrolidinium, pyridinium, pyrimidinium, imidazolium, piperidinium, pyrazolium, oxazolium, pyridazinium, phosphonium, sulfonium, triazolium, or a combination thereof, and an anion comprising $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $SO_{42}^-$, $CF_3SO_3^-$, $CF_3CO_2^-$, $(C_2FsSO_2)(CF_3SO_2)N^-$, $NO_3^-$, $Al_2Cl_7^-$, $CH_3COO^-$, $CH_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

For example, the ionic liquid may comprise N-methyl-N-propyl pyrrolidinium bis(trifluoromethane sulfonyl)imide, N-butyl-N-methyl pyrrolidinium bis(trifluoromethyl sulfonyl)imide, 1-butyl-3-methyl imidazolium bis(trifluoromethyl sulfonyl)imide, 1-ethyl-3-methyl imidazolium bis(trifluoromethyl sulfonyl)imide, or a combination thereof.

A molar ratio of the ionic liquid to the salt may be from about 0.1:1 to about 2:1, about 0.2:1 to about 1.8:1, or about 0.5:1 to about 1:1. When the molar ratio of the ionic liquid to the salt is within this range, mobility and ion conductivity of alkali metal ions and/or alkaline earth metal ions may further be enhanced between the electrolyte and the positive electrode.

The plasticizer may comprise a phthalate plasticizer, a trimellitate plasticizer, a phosphate plasticizer, a polyester plasticizer, and a chloride plasticizer. Examples of the phthalate plasticizer may include dibutyl phthalate (DBP), diisononyl phthalate (DINP), diisodecyl phthalate (DIDP), butylbenzyl phthalate (BBP), or a combination thereof. Examples of the trimellitate plasticizer may include triethylhexyl trimellitate (TOTM), triisononyl trimellitate (TINTM), and triisodecyl trimellitate (TIDTM). Examples of the phosphate plasticizer may include tricresyl phosphate (TCP), tri-2-ethylhexyl phosphate (TOP), and cresyl diphenyl phosphate (CDP). Examples of the polyester plasticizer may include polyester having a weight average molecular weight (Mw) of about 8,000 Daltons (Da) or less, e.g., about 500 Da to about 8000 Da, about 1000 Da to about 7000 Da, or about 2000 Da to about 6000 Da. The chloride plasticizer may have chlorine content of about 35% to about 70%, about 40% to about 60%, or about 50% to about 55%.

An amount of the plasticizer may be from about 1 parts by weight to about 25 parts by weight, or about 2 parts by weight to about 10 parts by weight, based on 100 parts by weight of the positive electrode. When the amount of the plasticizer is within this range, the positive active material layer has flexibility appropriate for being efficiently formed on the positive current collector.

The positive active material may include a compound capable of intercalation and deintercalation of lithium, inorganic sulfur (Sa), or a sulfur-based compound.

For example, the compound capable of intercalation and deintercalation of lithium may be a lithium-containing metal oxide. The lithium-containing metal oxide may be any suitable metal oxide including lithium used in the art without limitation.

For example, the lithium-containing metal oxide may comprise a composite oxide of lithium and a metal selected from cobalt (Co), manganese (Mn), nickel (Ni), and a combination thereof. Particularly, the lithium-containing metal oxide may be any compound represented by any of the formulae: $Li_aA_{1-b}B'_bD'_2$ (where $0.90 \le a \le 1$ and $0 \le b \le 0.5$); $Li_aE_{1-b}B'_bO_{2-c}D'_c$ (where $0.90 \le a \le 1$, $0 \le b \le 0.5$, and $0 \le c \le 0.05$); $LiE_{2-b}B'_bO_{4-c}D'_c$ (where $0 \le b \le 0.5$ and $0 \le c \le 0.05$); $Li_aNi_{1-b-c}Co_bB'_cD'_\alpha$ (where $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD'_\alpha$ (where $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dG_eO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is Ni, Co, Mn, or a combination thereof; B' is Al, Ni, Co, Mn, Cr, Fe, Mg, Sr, V, a rare earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; I' is Cr, V, Fe, Sc, Y, or a combination thereof; and J is V, Cr, Mn, Co, Ni, Cu, or a combination thereof.

For example, the positive active material may comprise lithium nickel oxide, lithium nickel cobalt oxide, lithium nickel cobalt manganese oxide, lithium nickel cobalt aluminum oxide, LiFePO$_4$, or a combination thereof.

For example, the sulfur-based compound may be Li$_2$Sn (n=1), an organosulfur compound, or a carbon-sulfur polymer ((C$_2$S$_x$)$_n$ where x=2.5-50 and n=2).

The positive electrode may have an operating voltage of about 2.0 V to about 4.5 V (vs. Li/Li$^+$).

The positive active material layer may have adhesiveness of 0.2 kiloNewtons per meter (kN/m) to the positive current collector. Thus, interfacial contact resistance between the positive electrode and the electrolyte may be reduced, and the metal secondary battery including the positive electrode may have improved electrochemical properties, e.g., improved initial charge/discharge capacity, charge/discharge efficiency, and lifespan characteristics at a high voltage of 4.2 V (vs. Li/Li$^+$).

A metal secondary battery according to another embodiment may include a negative electrode including a lithium metal or a lithium alloy, the positive electrode, and an electrolyte membrane or separator interposed between the negative electrode and the positive electrode. For example, the metal secondary battery may be a lithium secondary battery.

FIG. 1 is a schematic diagram of an embodiment of a lithium secondary battery 10.

As illustrated in FIG. 1, the lithium secondary battery 10 includes a lithium or lithium alloy negative electrode 12, and a positive electrode including a positive current collector 18 and a positive active material layer 14 disposed on the positive current collector 18. A polymer electrolyte membrane or separator 16, in which a polymer electrolyte coating layer is formed on two sides of a porous substrate, is disposed between the lithium or lithium alloy negative electrode 12 and the positive electrode. A protective layer 20 is disposed on one surface of the lithium or lithium alloy negative electrode 12. The protective layer 20 on the lithium negative electrode 12 is illustrated as an example, and the lithium or lithium alloy negative electrode 12 may be used alone without having the protective layer 20 thereon.

The lithium or lithium alloy negative electrode 12 may include lithium metal or an alloy of lithium, and Si, Sn, Al, Ge, Pb, Bi, Sb, a Si—Y' alloy (where Y' is alkali metal, alkali earth metal, Groups 13 to 16 element, transition metal, rare earth element, or any combination thereof (except for Si)), or a Sn—Y' alloy (where Y' is alkali metal, alkali earth metal, Groups 13 to 16 element, transition metal, rare earth element, or any combination thereof (except for Sn)). In this regard, the element Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or any combination thereof. The lithium or lithium alloy negative electrode 12 may have a thickness of about 50 nanometers (nm) to about 100 micrometers (μm).

The protective layer 20 may include an ion-conductive polymer or a copolymer of an ion-conductive polymer and an ion-nonconductive polymer, and a lithium salt. Examples of the ion-conductive polymer may include polyethylene oxide (PEO), polysiloxane, polypropylene oxide (PPO), polyethylene oxide-grafted polymethyl methacrylate (PEO grafted PMMA), and polysiloxane-grafted PMMA. Examples of the ion-nonconductive polymer may include PMMA, polyvinyl pyridine, polyimide, polyethylene, polypropylene, polyvinylidene fluoride (PVdF), polyacrylonitrile (PAN), and polydimethyl siloxane (PDMS). The protective layer 20 may have a thickness of about 500 nm to about 2 μm. The protective layer 20 may be partially formed on a surface of the lithium or lithium alloy negative electrode 12 or as a separate single layer or as multiple layers. The protective layer 20 may be a gel phase or solid phase layer.

If the protective layer 20 is disposed on the lithium or lithium alloy negative electrode 12, dendrite growth may be inhibited on a surface of the lithium or lithium alloy negative electrode 12. Accordingly, the lithium secondary battery may have improved mechanical properties and improved lithium ion mobility.

For example, the lithium secondary battery may be prepared as follows.

First, the lithium or lithium alloy negative electrode 12 may be prepared by the following method.

The lithium or lithium alloy negative electrode 12 may be prepared by pressing a lithium or lithium alloy ingot on a negative current collector in a container, e.g., a sealed container. Also, the lithium or lithium alloy negative electrode 12 may be prepared via deposition by which the lithium or lithium alloy is deposited on a metal or plastic substrate to form a film.

Any suitable current collector may be used as the negative current collector, and a material, a form, and a manufacturing method thereof are not limited. For example, a copper foil having a thickness of about 10 μm to about 100 μm, a perforated copper foil having a thickness of about 10 μm to about 100 μm and a pore diameter of about 0.1 mm to about 10 mm, an expanded metal, or a foamed metal plate may be used. The negative current collector may also be formed of stainless steel, titanium, nickel, or the like, as well as copper.

The positive current collector 18 may be a metal such as nickel, aluminum, titanium, copper, gold, silver, platinum, an aluminum alloy, or stainless steel; a film prepared by plasma-spraying or arc-spraying a carbonaceous material; activated carbon fiber; nickel, aluminum, zinc, copper, tin, lead, or any alloy thereof; or a conductive film prepared by dispersing a conductive agent in rubber or a resin such as styrene-ethylene-butylene-styrene copolymer (SEBS). For example, aluminum, nickel, or stainless steel may be used. Particularly, aluminum may be used due to the efficiency by which aluminum may be processed into a thin film and manufacturing costs thereof. A form of the positive current collector 18 is not particularly limited. For example, the positive current collector 18 may have a form of a thin film, a flat plate, a mesh, a net, a punched form, an embossed form, or a combination thereof, e.g., a meshed flat plate or the like. For example, the positive current collector 18 may have an uneven surface formed by etching.

The positive active material layer 14 may include a positive active material, a salt selected from an alkali metal salt, an alkaline earth metal salt, or a combination thereof, and a polymeric first binder having a repeating unit represented by Formula 1.

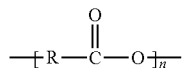

Formula 1

In Formula 1, R may be a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or a combination thereof, and n may be an integer from about 90 to about 2,700, about 160 to about 2,000, about 240 to about 1500, about 360 to about 1,000, or about 500 to about 1,000.

Types, examples, and amounts of the positive active material, the salt, and the polymeric first binder having the repeating unit represented by Formula 1, and the weight ratio of the polymeric first binder having the repeating unit represented by Formula 1 to the salt are described above, and thus, descriptions thereof will not be repeated hereinafter.

The positive active material layer 14 may further comprise a second binder, an oligomer, an organic solvent, an ionic liquid, a plasticizer, or a combination thereof. Types and amounts of the second binder, the oligomer, the organic solvent, the ionic liquid, and the plasticizer, and the molar ratio of the ionic liquid to the salt are described above, and thus, descriptions thereof will not be repeated hereinafter.

The positive active material layer 14 may further include a conductive material and an organic solvent.

Examples of the conductive material include: carbon black, graphite, natural graphite particulates, artificial graphite, acetylene black, Ketjen black, and carbon fiber; carbon nanotube; copper, nickel, aluminum, and silver, each of which may be used in powder, fiber, or tube form; and a conductive polymer such as polyphenylene derivatives. However, the conductive material is not limited thereto, and any suitable conductive material used in the art may also be used.

Examples of the organic solvent may include N-methylpyrrolidone (NMP), tetrahydrofuran (THF), acetone, or water. However, the solvent is not limited thereto, and any suitable solvent used in the art may also be used.

The positive electrode may be prepared as follows.

The positive active material, the conductive material, the first binder and optionally the second binder, and the solvent are mixed to prepare a positive active material composition, e.g., a positive active material slurry. The positive active material composition is directly coated on the positive current collector 18 and dried to prepare a positive electrode on which the positive active material layer 14 is formed. Alternatively, the positive electrode may be prepared by casting the positive active material composition on a separate support and laminating a film separated from the support on the current collector. If desired, a plasticizer may further be added to the positive active material composition to form pores in the positive electrode.

The positive active material, the conductive material, the first binder and optionally the second binder, and the solvent may be used in amounts used in lithium secondary batteries. One or more of the conductive material, the second binder, and the solvent may be omitted with in accordance with a purpose and a structure of a lithium secondary battery.

Next, the polymer electrolyte membrane or separator 16, in which a polymer electrolyte layer is formed on two surfaces of a substrate, is prepared for insertion between the lithium or lithium alloy negative electrode 12 and the positive electrode.

The polymer electrolyte membrane 16 may comprise a salt and a polymer having a repeating unit represented by Formula 1 below.

Formula 1

In Formula 1, R may be a substituted or unsubstituted C2-C5 alkylene group, a substituted or unsubstituted C2-C6 alkoxylene group, a substituted or unsubstituted C2-C6 alkoxycarbonylene group, a substituted or unsubstituted C2-C6 alkylene oxide group, or any combination thereof, and n may be an integer from 90 to 2,700, about 90 to about 2,500, about 160 to about 2,000, or about 240 to about 1500.

Since a liquid electrolyte is not used in the polymer electrolyte membrane 16, side reactions between the electrolyte and the positive electrode may be reduced. The polymer having the repeating unit represented by Formula 1 included in the polymer electrolyte membrane 16 may be dissolved in various organic solvents enabling easy processing of the polymer electrolyte membrane 16. In addition, the polymer having the repeating unit represented by Formula 1 included in the polymer electrolyte membrane 16 is a solid electrolyte compatible with a positive electrode for a high voltage of 4.2 V (vs. $Li/Li^+$), and may provide high energy density. Thus, a lithium secondary battery including the polymer electrolyte membrane 16 may have improved electrochemical properties, e.g., initial charge/discharge capacity, charge/discharge efficiency, and lifespan characteristics.

The separator 16 may include a porous substrate, and a polymer electrolyte layer, formed on at least one surface of the porous substrate, including the salt and the polymer having the repeating unit represented by Formula 1.

The porous substrate may include monolayered substrate such as polyethylene, polypropylene, or a multi-layered substrate such as a polyethylene/polypropylene double-layered substrate, a polyethylene/polypropylene/polyethylene triple-layered substrate, or a polypropylene/polyethylene/polypropylene triple-layered substrate. The separator 16 may further include a liquid electrolyte including the lithium salt and the organic solvent described above.

The separator 16, like the polymer electrolyte membrane 16, is compatible with a positive electrode for a high voltage of 4.2 V (vs. $Li/Li^+$) and may provide high energy density. Thus, a lithium secondary battery including the separator 16 may have improved electrochemical properties, e.g., improved initial charge/discharge capacity, charge/discharge efficiency, and lifespan characteristics. Also, the lithium secondary battery may have improved mechanical properties since the polymer electrolyte layer is formed on at least one surface of the porous substrate.

The polymer electrolyte membrane or separator 16 may have a thickness of about 20 μm to about 100 μm. When the thickness of the polymer electrolyte membrane or separator 16 is within this range, improved mechanical strength and improved electrochemical properties, e.g., improved initial charge/discharge capacity, charge/discharge efficiency, and lifespan characteristics may be obtained.

A weight ratio of the polymer having the repeating unit represented by Formula 1 to the salt may be from about 8:2 to about 5:5, for example, from about 7:3 to about 5:5.

When the weight ratio of the polymeric first binder including the repeating unit represented by Formula 1 to the salt is within these ranges, the alkali metal salt and/or alkaline earth metal salts do not precipitate and have appropriate solubility, thereby enhancing mobility and ion conductivity of the alkali metal ions or alkaline earth metal ions. Also, mechanical properties thereof may be maintained.

The polymer electrolyte layer may have an oxidation initiation voltage of 4.35 V or greater (vs. Li/Li$^+$).

The metal secondary battery may have a capacity retention of 80% or greater to a 20$^{th}$ cycle at 60° C. at an operating voltage of about 3.0 V to about 4.2 V (vs. Li/Li$^+$).

The metal secondary battery may have an average Coulombic efficiency of 95% or greater to a 20$^{th}$ cycle at 60° C. at an operating voltage of about 3.0 to about 4.2 V (vs. Li/Li$^+$).

Also, the lithium secondary battery may be stacked in a bi-cell structure forming a battery structure. Also, a plurality of battery structures may be stacked to form a battery pack suitable for an apparatuses to provide high capacity and high output, for example, notebook computers, smartphones, and electric vehicles.

The lithium secondary battery having excellent storage stability, lifespan characteristics, and high-rate characteristics at high temperature may be applied to electric vehicles (EVs), e.g., hybrid electric vehicles such as plug-in hybrid electric vehicles (PHEVs).

Hereinafter, an embodiment will be described in detail with reference to the following examples and comparative examples. However, these examples are not intended to limit the purpose and scope of the one or more example embodiments.

EXAMPLES

Example 1: Preparation of Lithium Secondary Battery (Coin Cell)

(1) Preparation of Positive Electrode

A positive active material slurry was prepared by adding LiNi$_{0.5}$Co$_{0.15}$Mn$_{0.05}$O$_2$ as a positive active material powder, carbon black (Super-P®) as a conductive material, polyvinylidene fluoride (PVDF) as a second binder, and lithium bis(trifluoromethane sulfonyl)imide (Li(CF$_3$SO$_2$)$_2$N, LiTFSI) as a lithium salt powder to a solution prepared by dissolving 5% by weight of a polymeric first binder having a repeating unit represented by Formula 2 below (Sigma Aldrich, Mn: 80,000) in N-methylpyrrolidone (NMP) at 80° C. for 1 hour, and blending the mixture such that a weight ratio of the positive active material:the conductive material: the first binder: the second binder:the lithium salt was 80:5:5:5:5.

The positive active material slurry was coated on both surfaces of a 15 μm-thick aluminum foil to a thickness of a coating layer of 200 μm and dried at 120° C. for 3 hours or longer, and the resultant structure was pressed to prepare a positive electrode having a thickness of 120 μm.

Formula 2

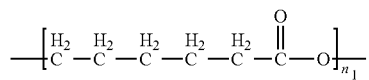

(2) Preparation of Negative Electrode

A lithium ingot was placed on a 10 μm-thick copper foil current collector and pressed to prepare a lithium negative electrode having a thickness of 20 μm.

(3) Preparation of Separator Having Polymer Electrolyte Coating Layer.

A polymer electrolyte solution was prepared by adding lithium bis(trifluoromethane sulfonyl)imide (Li(CF$_3$SO$_2$)$_2$N, LiTFSI) as a lithium salt powder to a solution prepared by dissolving 5% by weight of a polymer having a repeating unit represented by Formula 2 above in tetrahydrofuran (THF) at 60° C. for 1 hour, such that a weight ratio of the polymer to the lithium salt was 1:1.

A polyethylene substrate having a thickness of about 20 μm (separator, STAR 20, available from Asahi) was impregnated with the polymer electrolyte solution and dried at 40° C. in a convection oven for 2 hours, and then further dried at 60° C. in a vacuum oven for 24 hours, to prepare a separator in which polymer electrolyte coating layers are formed on two sides of the polyethylene substrate to a thickness of 7 μm.

(4) Preparation of Lithium Secondary Battery (Coin Cell)

A lithium secondary battery (coin cell) was prepared by winding the positive electrode, the negative electrode, and the separator having the polymer electrolyte layer in a predetermined size, and performing a cell assembling process.

Example 2: Preparation of Lithium Secondary Battery (Coin Cell)

A lithium secondary battery (coin cell) was prepared in the same manner as in Example 1, except that a polymer electrolyte solution was prepared by adding lithium bis (trifluoromethane sulfonyl)imide (Li(CF$_3$SO$_2$)$_2$N, LiTFSI) as a lithium salt powder to the solution prepared by dissolving 5% by weight of the polymer having the repeating unit represented by Formula 2 above in tetrahydrofuran (THF) at 60° C. for 1 hour, such that a weight ratio of the polymer to the lithium salt was 7:3 instead of 1:1 as in the preparation of the separator having the polymer electrolyte coating layer performed in operation (3) above.

Example 3: Preparation of Lithium Secondary Battery (Coin Cell)

A lithium secondary battery (coin cell) was prepared in the same manner as in Example 1, except that a polymer electrolyte solution was prepared by adding lithium bis (trifluoromethane sulfonyl)imide (Li(CF$_3$SO$_2$)$_2$N, LiTFSI) as a lithium salt powder to the solution prepared by dissolving 5% by weight of the polymer having the repeating unit represented by Formula 2 above in tetrahydrofuran (THF) at 60° C. for 1 hour, such that a weight ratio of the polymer to the lithium salt was 3:7 instead of 1:1 as in the preparation of the separator having the polymer electrolyte coating layer performed in operation (3) above.

Example 4: Preparation of Lithium Secondary Battery (Coin Cell)

A lithium secondary battery (coin cell) was prepared in the same manner as in Example 1, except that LiFePO$_4$ as a positive active material powder, carbon black (Super-P®) as a conductive material, polyvinylidene fluoride (PVDF) as a second binder, and lithium bis(trifluoromethane sulfonyl) imide (Li(CF$_3$SO$_2$)$_2$N, LiTFSI) as a lithium salt powder were added to the solution prepared by dissolving 5% by weight of the polymeric first binder having the repeating unit represented by Formula 2 above (Sigma Aldrich, Mn: 80,000) in tetrahydrofuran (THF) at 60° C. for 1 hour, such that the weight ratio of the positive active material:the conductive material:the first binder:the second binder:the lithium salt was 60:10:15:5:10 in the preparation of the positive electrode performed in operation (1) above, instead of adding $LiNi_{0.5}Co_{0.15}Mn_{0.05}O_2$ as the positive active material powder, carbon black (Super-P®) as the conductive material, polyvinylidene fluoride (PVDF) as the second binder, and lithium bis(trifluoromethane sulfonyl)imide (Li$(CF_3SO_2)_2$N, LiTFSI) as the lithium salt powder to the solution such that the weight ratio of the positive active material:the conductive material:the first binder:the second binder:the lithium salt was 80:5:5:5:5.

Comparative Example 1: Preparation of Lithium Secondary Battery (Coin Cell)

A lithium secondary battery (coin cell) was prepared in the same manner as in Example 1, except that $LiNi_{0.5}Co_{0.15}Mn_{0.05}O_2$ as a positive active material powder, carbon black (Super-P®) as a conductive material, polyvinylidene fluoride (PVDF) as a second binder, and lithium bis(trifluoromethane sulfonyl)imide (Li$(CF_3SO_2)_2$N, LiTFSI) as a lithium salt powder were added to a solution prepared by dissolving 5% by weight of polyethylene oxide as a first binder (Sigma Aldrich, Mn: 90,000), instead of the polymeric first binder having the repeating unit represented by Formula 2 (Sigma Aldrich, Mn: 80,000), in NMP at 80° C. for 1 hour, such that the weight ratio of the positive active material:the conductive material:the first binder:the second binder:the lithium salt was 80:5:5:5:5 in the preparation of the positive electrode performed in operation (1) above, and except that a polymer electrolyte slurry was prepared by adding lithium bis(trifluoromethane sulfonyl)imide (Li$(CF_3SO_2)_2$N, LiTFSI) as a lithium salt powder to a solution prepared by dissolving 5% by weight of the polyethylene oxide polymer (Sigma Aldrich, Mn: 90,000), instead of the polymer having the repeating unit represented by Formula 2 above, in THF at 60° C. for 1 hour, such that the weight ratio of the polymer to the lithium salt was 1:1 in the preparation of the separator having the polymer electrolyte coating layer performed in operation (3).

Comparative Example 2: Preparation of Lithium Secondary Battery (Coin Cell)

A lithium secondary battery (coin cell) was prepared in the same manner as in Example 1, except that 5% by weight of a polymeric first binder having the repeating unit represented by Formula 2 above (Sigma Aldrich, Mn: 10,000) was used instead of the polymeric first binder having the repeating unit represented by Formula 2 above (Sigma Aldrich, Mn: 80,000) in the preparation of the positive electrode performed in operation (1) above.

Reference Example 1: Preparation of Separator Having Polymer Electrolyte Coating Layer A polymer electrolyte solution not including lithium bis(trifluoromethane sulfonyl)imide (Li$(CF_3SO_2)_2$N, LiTFSI) as a lithium salt powder and prepared by dissolving 5% by weight of the polymer having the repeating unit represented by Formula 2 above in THF at 60° C. for 1 hour was prepared.

A polyethylene substrate having a thickness of about 20 μm (separator, STAR 20, available from Asahi) was impregnated with the polymer electrolyte solution and dried at 40° C. in a convection oven for 2 hours, and further dried at 60° C. in a vacuum oven for 24 hours, to prepare a separator having polymer electrolyte coating layers on two sides thereof of a thickness of 7 μm.

Analysis Example 1: X-Ray Diffraction (XRD) Analysis

XRD tests were performed on the polymer electrolyte coating layers of the separators of the lithium secondary batteries prepared according to Examples 1, 2, and 3, and on the polymer electrolyte coating layer of the separator prepared according to Reference Example 1. The test results are shown in FIG. 2.

An X-ray diffractometer (Rigaku RINT2200HF+ diffractometer using CuKα radiation (1.540598 Å)) was used.

Figure 2:
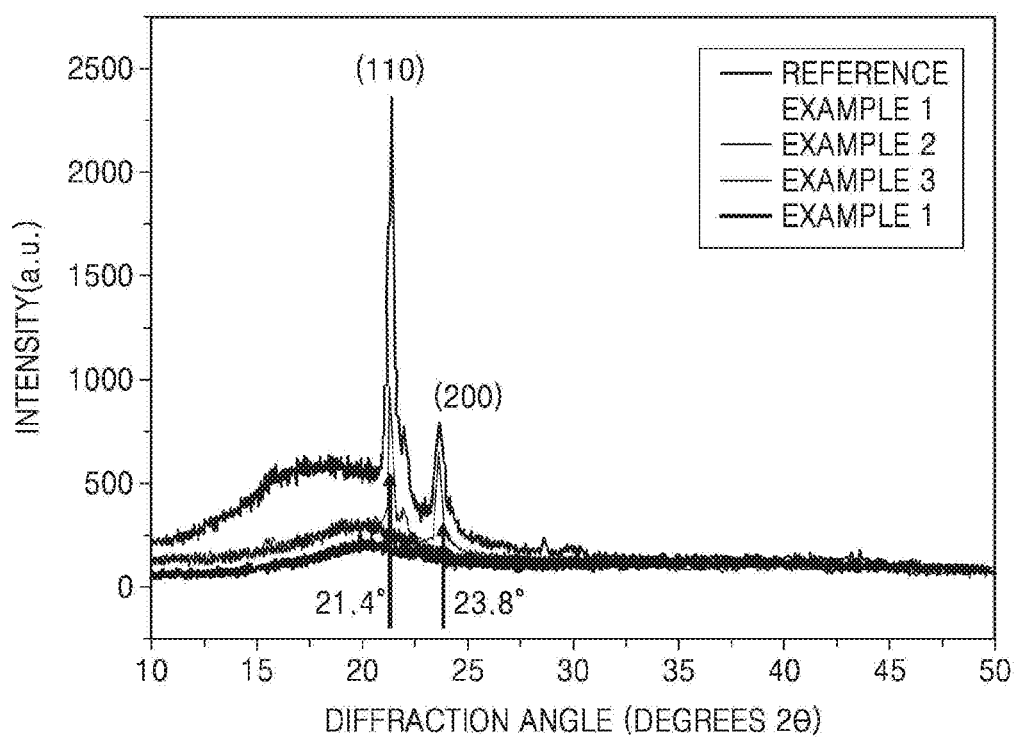
FIG. 2 is a graph of intensity (arbitrary units, a.u.) versus diffraction angle (degrees two-theta, 2θ) illustrating X-ray diffraction (XRD) analysis results of polymer electrolyte layers of separators of lithium secondary batteries prepared according to Examples 1, 2, and 3 and a polymer electrolyte coating layer of a separator prepared according to Reference Example 1.

Referring to FIG. 2, peaks are found at Bragg (2θ) angles of 21.4° and 23.8° in the XRD spectrum of the polymer electrolyte coating layer of the separator prepared according to Reference Example 1. These peaks indicate that X-ray beams are diffracted by lattice planes (110) and (200) of the polymer having the repeating unit represented by Formula 2 above.

Intensities of peaks of the polymer electrolyte coating layer of the separator of the lithium secondary battery prepared according to Example 2 were less than those of the polymer electrolyte coating layer of the separator prepared according to Reference Example 1 at the Bragg (2θ) angles of 21.4° and 23.8°.

Peaks of the polymer electrolyte coating layers of the separators of the lithium secondary batteries prepared according to Examples 1 and 3 gradually disappear at the Bragg (2θ) angles of 21.4° and 23.8° in comparison with the polymer electrolyte coating layer of the separator prepared according to Reference Example 1.

Thus, it may be confirmed that crystallinity of the polymer decreases as the amount of the lithium salt increases in the polymer having the repeating unit represented by Formula 2 above.

Evaluation Example 1: Evaluation of Adhesiveness

Adhesiveness of the positive active material layers to the positive current collectors of the positive electrodes of the lithium secondary batteries prepared according to Example 1 and Comparative Example 1 were evaluated.

To test adhesiveness, peel strength was evaluated in accordance with ASTM D6862—90 Degree Peel Resistance of Adhesives. After attaching 3M tape having a predetermined length and width to a surface of the positive active material layer, a 90° peel-off test was performed at a rate of 50 mm/min using a tensile strength tester (Shimadzu Corp.) to measure a force used to detach the positive active material layer from the positive current collector, i.e., adhesiveness (kN/m). The results are shown in Table 1 below.

TABLE 1

| | Adhesiveness (kN/m) |
|---|---|
| Example 1 | 0.8 |
| Comparative Example 1 | 0.1 |

Referring to Table 1, adhesiveness of the positive active material layers to the positive current collectors of the positive electrodes prepared according to Example 1 and Comparative Example 1 was 0.8 kN/m and 0.1 kN/m, respectively.

Thus, it was confirmed that adhesiveness of the positive active material layer to the positive current collector of the positive electrode of the lithium secondary battery prepared according to Example 1 was greater than that according to Comparative Example 1.

Evaluation Example 2: Linear Sweep Voltammetry (LSV) Analysis

Tri-electrode cells, as beaker cells, were prepared using the separators having the polymer electrolyte coating layers of the lithium secondary batteries prepared according to Example 1 and Comparative Example 1. Oxidation behaviors of the separators having the polymer electrolyte coating layers were evaluated at a working electrode. The results are shown in FIGS. 3A and 3B.

A stainless steel electrode (SUS316) was used as a working electrode, and lithium metal was used as a counter electrode and as a reference electrode. Measurement was performed at 60° C. at an open circuit voltage (OCV) of 5 V (vs. Li/Li$^+$) at a scan rate of 1 mV/sec.

Figure 3A:
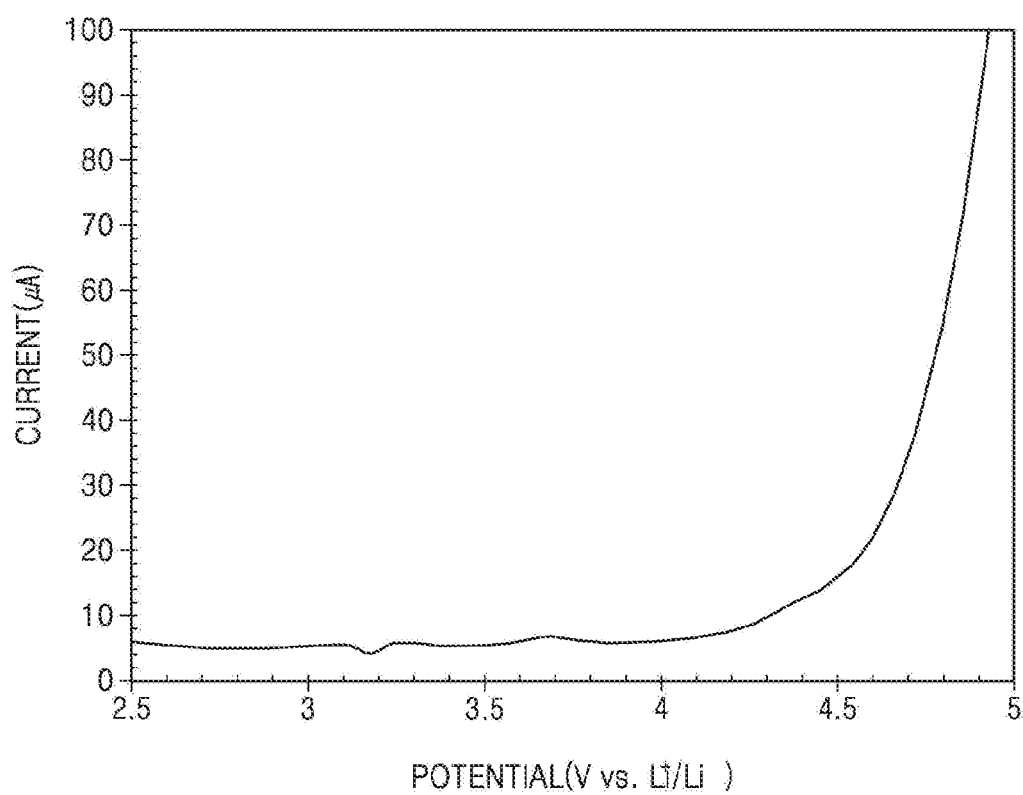
FIGS. 3A and 3B are each a graph of current (microamperes, μA) versus potential (volts versus Li/Li$^+$) illustrating linear sweep voltammetry (LSV) results of separators having polymer electrolyte layers of the lithium secondary batteries prepared according to Example 1 and Comparative Example 1 at 60° C., respectively.
Figure 3B:
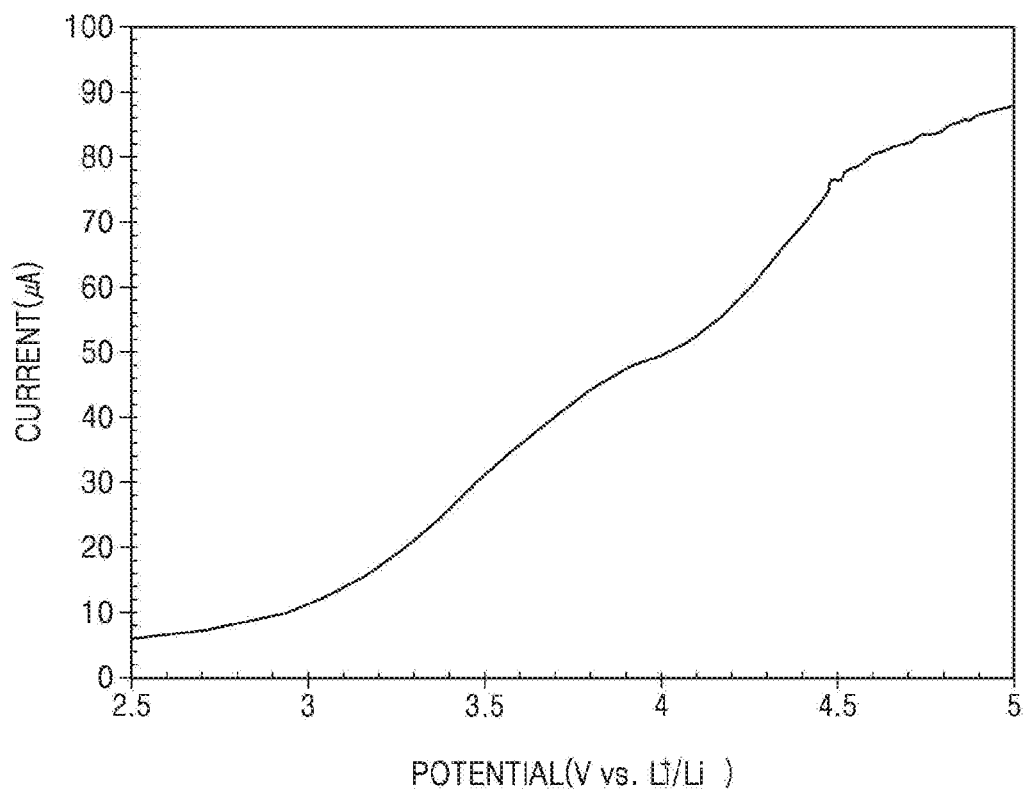

Referring to FIGS. 3A and 3B, oxidation onset potentials of the separators having the polymer electrolyte coating layers of the lithium secondary batteries according to Example 1 and Comparative Example 1 were about 4.6 V (vs. Li/Li$^+$, at 10 μA) and about 3 V (vs. Li/Li$^+$, at 10 μA), respectively.

Thus, it may be confirmed that the separator having the polymer electrolyte coating layer of the lithium secondary battery according to Example 1 had higher electrochemical oxidation stability than the separator having the polymer electrolyte coating layer of the lithium secondary battery prepared according to Comparative Example 1.

Evaluation Example 3: Chronoamperometry Analysis

Tri-electrode cells, as beaker cells, were prepared using the separators having the polymer electrolyte coating layers of the lithium secondary batteries prepared according to Example 1 and Comparative Example 1. Oxidation behaviors of the separators having the polymer electrolyte coating layers were evaluated at a working electrode. The results are shown in FIGS. 4A and 4B.

A stainless steel electrode (SUS316) was used as the working electrode, and lithium metal was used as a counter electrode and as a reference electrode. Measurement was performed at 60° C. at 4.0 V, 4.2 V, and 4.4 V (vs. Li/Li$^+$) for 2 hours.

Figure 4A:
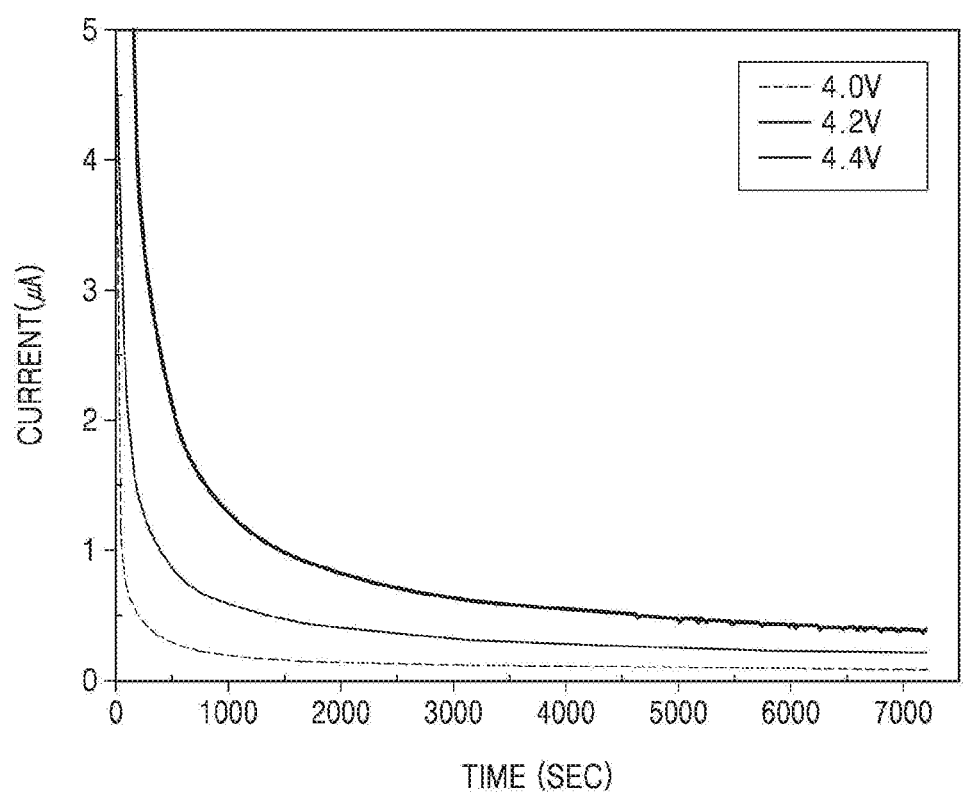
FIGS. 4A and 4B are each a graph of current (microamperes, μA) versus time (seconds, sec) illustrating chronoamperometry results of the separators having polymer electrolyte layers of the lithium secondary batteries prepared according to Example 1 and Comparative Example 1, respectively, at 60° C. and with voltages of 4.0 V, 4.2 V, and 4.4 V (vs. Li/Li$^+$)
Figure 4B:
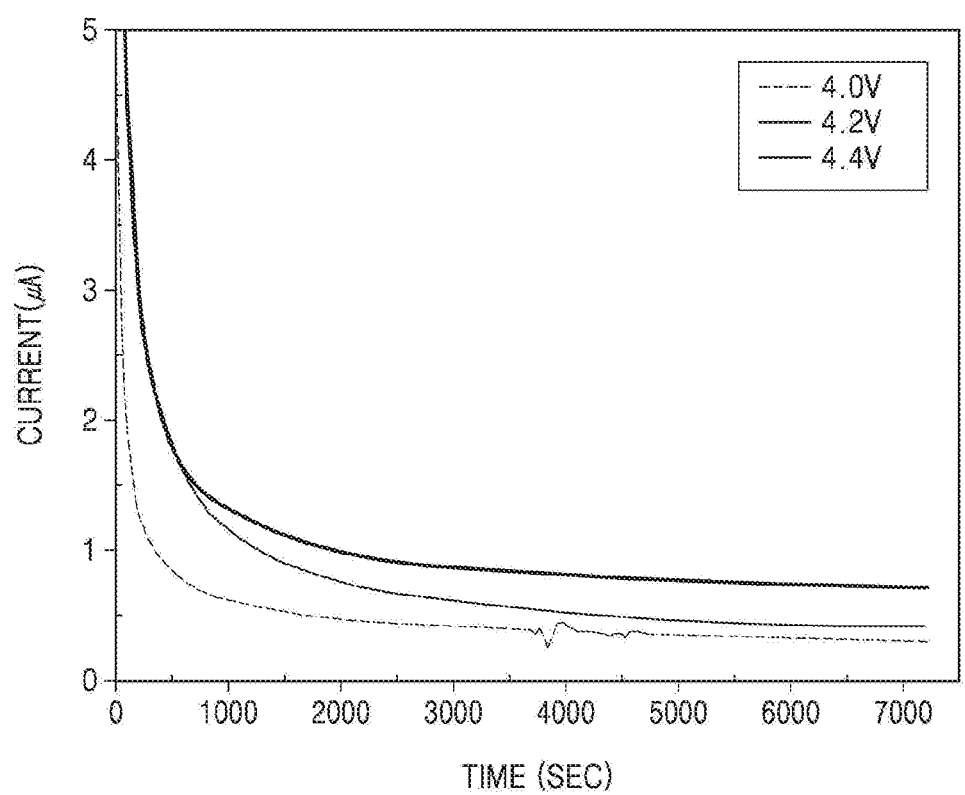
Figure 5A:
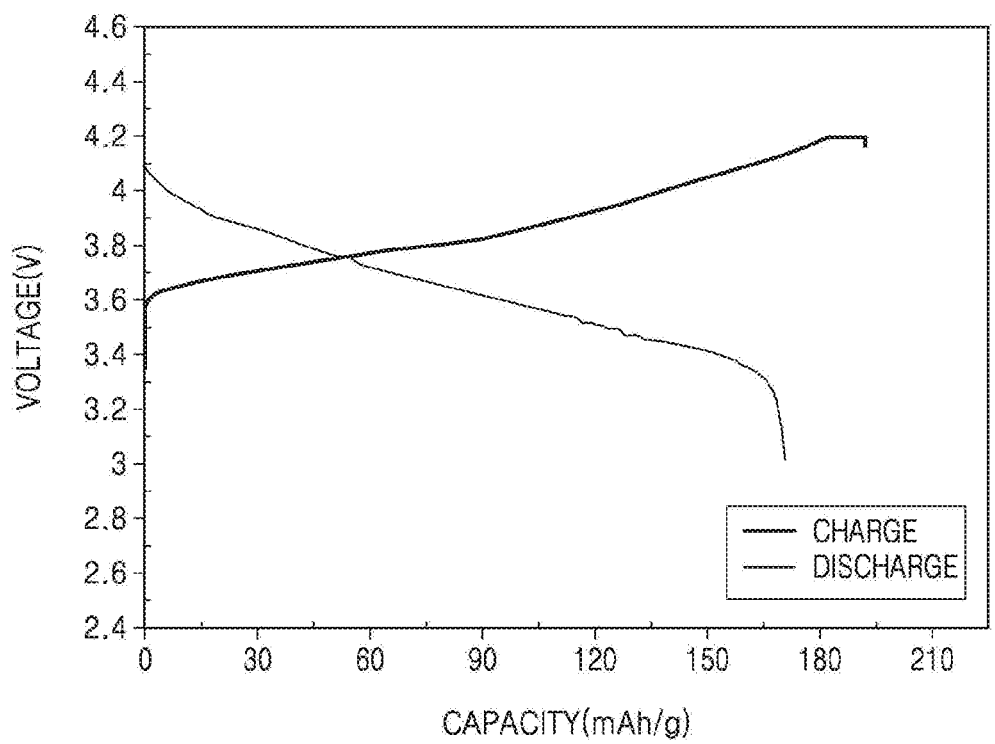
FIGS. 5A and 5B are each a graph of voltage (volts, V) versus capacity (milliampere-hours per gram, mAh/g) illustrating initial charge/discharge capacity of the lithium secondary batteries prepared according to Example 1 and Comparative Example 1, respectively, at 60° C. with a charge/discharge voltage of 3.0 V to 4.2 V (vs. Li/Li$^+$) and a current of 0.1 C (0.23 mA/cm$^2$)
Figure 5B:
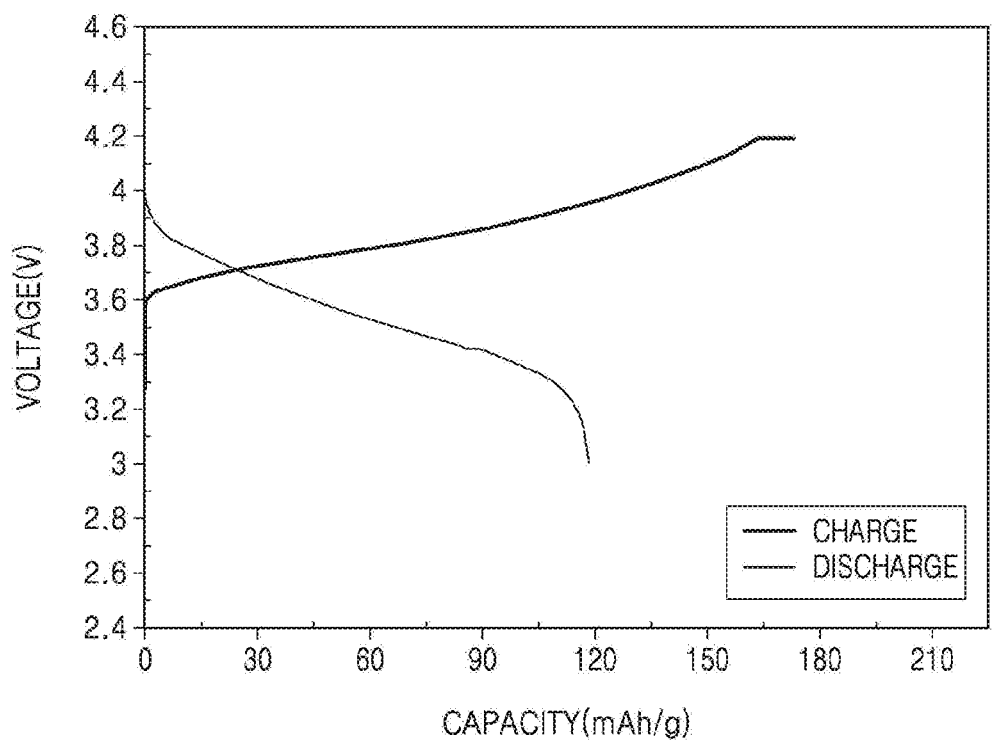

Referring to FIGS. 4A and 4B, currents of the separator having the polymer electrolyte coating layer of the lithium secondary battery according to Example 1 measured at 4.0 V, 4.2 V, and 4.4 V (vs. Li/Li$^+$) after 2 hours were 0.08 μA, 0.20 μA, and 0.38 μA, respectively. Currents of the separator having the polymer electrolyte coating layer of the lithium secondary battery according to Comparative Example 1 measured at 4.0 V, 4.2 V, and 4.4 V (vs. Li/Li$^+$) after 2 hours were 0.32 μA, 0.42 μA, and 0.71 μA, respectively.

Thus, it may be confirmed that the separator having the polymer electrolyte coating layer of the lithium secondary battery according to Example 1 has higher electrochemical oxidation stability than the separator having the polymer electrolyte coating layer of the lithium secondary battery according to Comparative Example 1.

Evaluation Example 4: Evaluation of Charge/discharge Characteristics (1) Evaluation of Charge/discharge Characteristics 1

The lithium secondary batteries prepared according to Examples 1 to 3 and Comparative Example 1 were tested under standard charge/discharge conditions at 60° C. in a charge/discharge voltage range of 3.0 V to about 4.2 V (vs. Li/Li$^+$).

Then, the lithium secondary batteries were charged at a constant current of 0.1 C (0.23 mA/cm$^2$) until the voltage reached 4.2 V, and charged at a constant voltage of 4.2 V until the current reached 0.05 C in a chamber at 60° C. Then, the batteries were discharged at a constant current of 0.1 C until the voltage reached 3.0 V, and initial charge/discharge capacity at a 1$^{st}$ cycle was measured.

Then, cycle lifespan characteristics thereof were evaluated by repeating the charging and discharging 20 times. Discharge capacity of each battery was measured at each cycle to a 20$^{th}$ cycle, and cycle lifespan characteristics were evaluated based on a cycle capacity retention (%). Coulomb efficiency and the cycle capacity retention (%) at 60° C. were calculated using Equations 1 and 2 below, respectively. The results are shown in Table 2, FIGS. 5A, 5B, 7A, and 7B. In Table 2 below, Coulomb efficiency (%) refers to a value obtained by dividing discharge capacity at the 1$^{st}$ cycle by charge capacity at the 1$^{st}$ cycle and then multiplying by 100.

Coulomb efficiency (%)=[(discharge capacity at 1$^{st}$ cycle/charge capacity at 1$^{st}$ cycle)×100%  Equation 1

Cycle capacity retention (%)=[discharge capacity of 20$^{th}$ cycle/discharge capacity of 1$^{st}$ cycle)×100%  Equation 2

TABLE 2

|  | Initial charge capacity (mAh/g) | Initial discharge capacity (mAh/g) | Coulomb efficiency (%) | Cycle capacity retention (%) |
| --- | --- | --- | --- | --- |
| Example 1 | 201 | 175 | 87 | 83 |
| Example 2 | 183 | 165 | 90 | 65 |
| Example 3 | 217 | 163 | 75 | 42 |
| Comparative Example 1 | 175 | 121 | 69 | 0 |

Referring to Table 2, FIGS. 5A, 5B, 7A, and 7B, the lithium secondary batteries prepared according to Examples 1 to 3 have higher initial charge capacity, initial discharge capacity, Coulomb efficiency, and cycle capacity retention than the lithium secondary battery prepared according to Comparative Example 1.

(2) Evaluation of Charge/discharge Characteristics 2

The lithium secondary batteries prepared according to Example 1 and Comparative Example 1 were tested under standard charge/discharge conditions at 60° C. in a charge/discharge voltage range of 3.0 V to about 4.4 V (vs. Li/Li$^+$).

Then, the lithium secondary batteries were charged at a constant current of 0.1 C (0.23 mA/cm$^2$) until the voltage reached 4.4 V and charged at a constant voltage of 4.4 V until the current reached 0.05 C in a chamber at 60° C. Then, the batteries were discharged at a constant current of 0.1 C until the voltage reached 3.0 V, and initial charge/discharge capacity at a 1$^{st}$ cycle was measured. Coulomb efficiency (%) at the 1$^{st}$ cycle at 60° C. were calculated using Equation 1. The results are shown in Table 3 and FIGS. 6A and 6B.

TABLE 3

| | Initial charge capacity (mAh/g) | Initial discharge capacity (mAh/g) | Coulombic efficiency (%) |
|---|---|---|---|
| Example 1 | 220 | 205 | 93 |
| Comparative Example 1 | 210 | 33 | 15 |

Figure 6A:
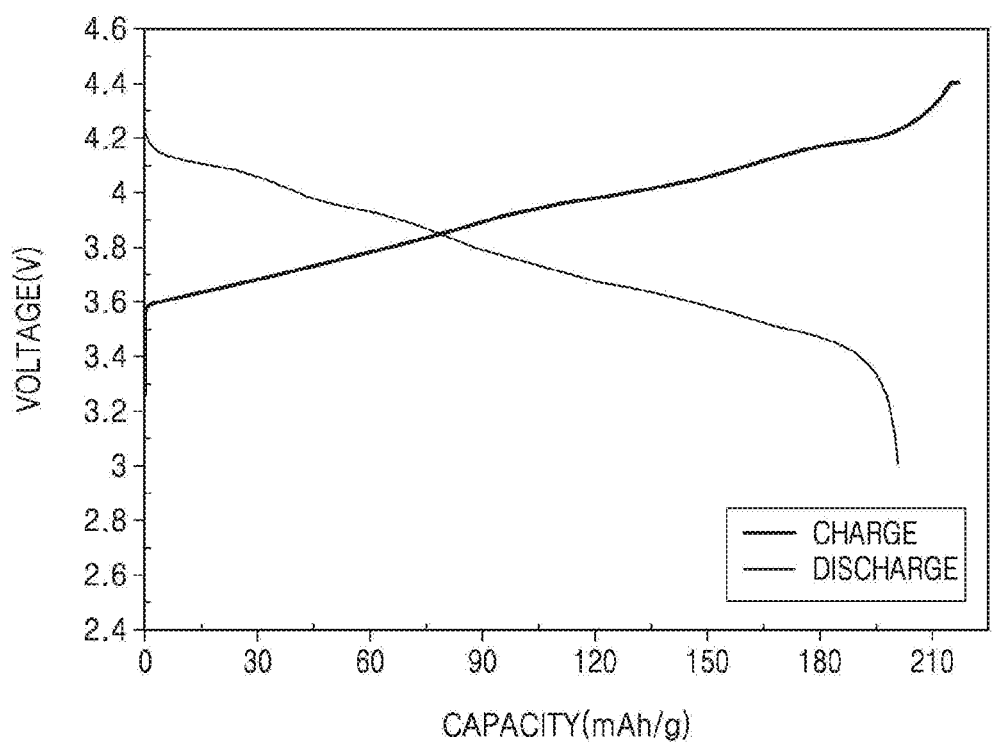
FIGS. 6A and 6B are each a graph of voltage (volts, V) versus capacity (milliampere-hours per gram, mAh/g) illustrating initial charge/discharge capacity of the lithium secondary batteries prepared according to Example 1 and Comparative Example 1, respectively, at 60° C. with a charge/discharge voltage of 3.0 V to 4.4 V (vs. Li/Li$^+$) and a current of 0.1 C (0.23 mA/cm$^2$)
Figure 6B:
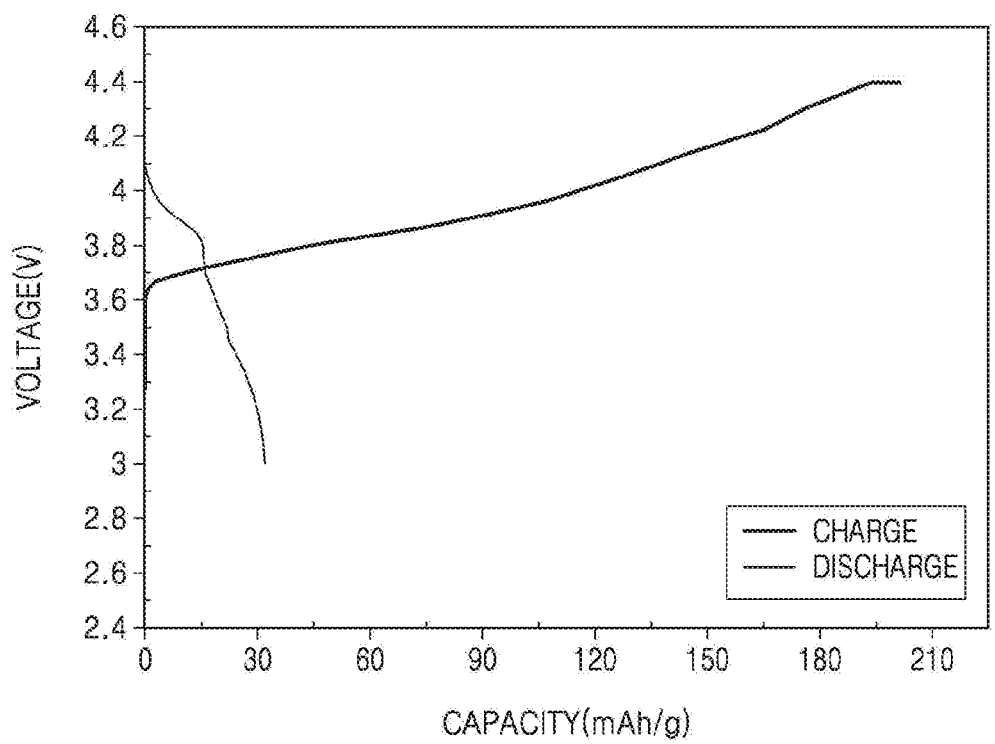
Figure 7A:
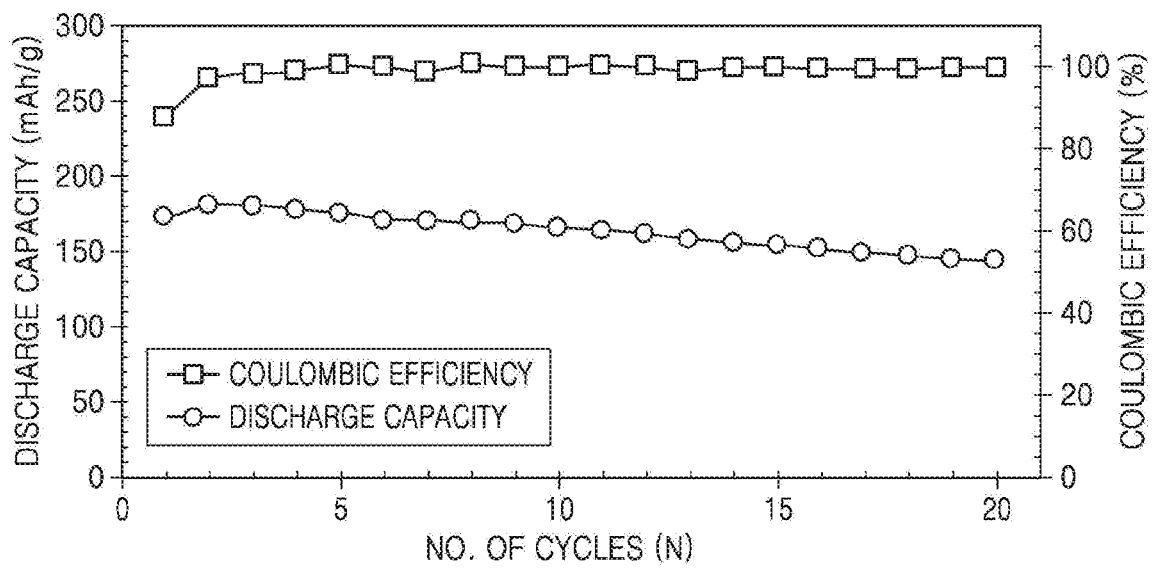
FIGS. 7A and 7B are each a graph of discharge capacity (milliampere-hours per gram, mAh/g) and coulombic efficiency (percent, %) versus number of cycles illustrating charge/discharge efficiency and lifespan characteristics of the lithium secondary batteries prepared according to Example 1 and Comparative Example 1, respectively, at 60° C. with a charge/discharge voltage of 3.0 V to 4.2 V (vs. Li/Li$^+$) and a current of 0.1 C (0.23 mA/cm$^2$)
Figure 7B:
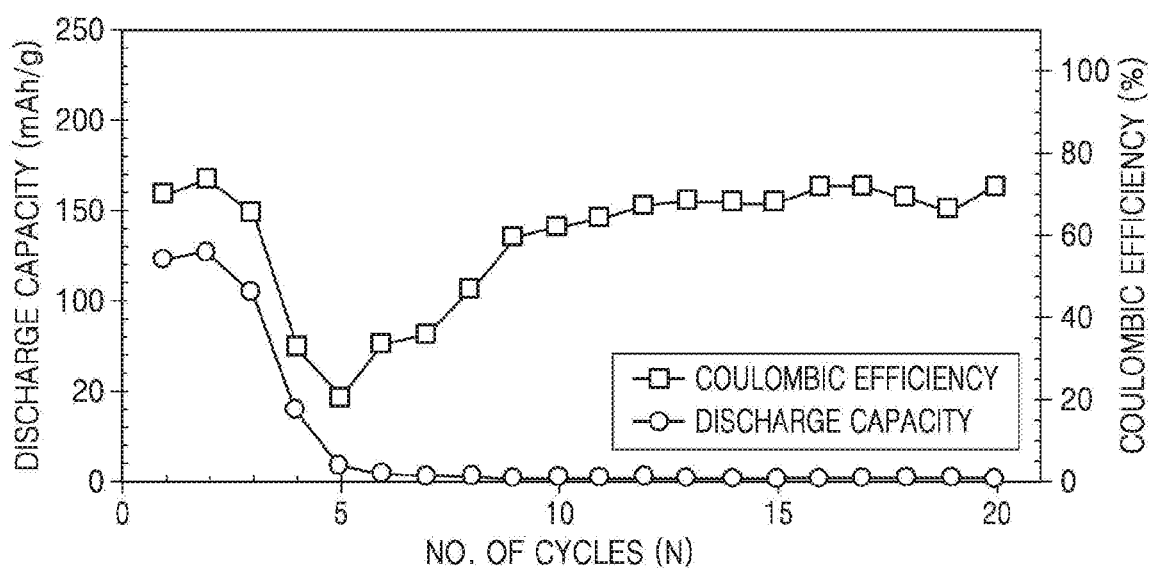

Referring to Table 3 and FIGS. 6A and 6B, the lithium secondary battery prepared according to Example 1 had higher initial charge capacity, initial discharge capacity, and Coulomb efficiency than the lithium secondary battery prepared according to Comparative Example 1.

(3) Evaluation of Charge/Discharge Characteristics 3

The lithium secondary battery prepared according to Example 4 was tested under standard charge/discharge conditions at 60° C. in a charge/discharge voltage range of 2.7 V to about 4.0 V (vs. Li/Li$^+$).

Then, the lithium secondary battery was charged at a constant current of 0.1 C (0.23 mA/cm$^2$) until the voltage reached 4.0 V and charged at a constant voltage of 4.0 V until the current reached 0.05 C in a chamber at 60° C. Then, the battery was discharged at a constant current of 0.1 C until the voltage reached 2.7 V, and initial charge/discharge capacity at a 1$^{st}$ cycle was measured.

Then, the lithium secondary battery was charged at a constant current of 0.2 C until the voltage reached 4.0 V and charged at a constant voltage of 4.0 V until the current reached 0.2 C. The battery was discharged at a constant current of 0.2 C until the voltage reached 2.7 V, and discharge capacity thereof was measured at a 2$^{nd}$ cycle.

Then, the lithium secondary battery was charged at a constant current of 0.3 C until the voltage reached 4.0 V and charged at a constant voltage of 4.0 V until the current reached 0.3 C. The battery was discharged at a constant current of 0.3 C until the voltage reached 2.7 V, and discharge capacity thereof was measured at a 3$^{rd}$ cycle.

Then, cycle lifespan characteristics were evaluated by repeating 25 cycles of charging and discharging at the same as the 3$^{rd}$ cycle. Discharge capacity of the battery was measured at each cycle to a 25$^{th}$ cycle, and cycle lifespan characteristics were evaluated based on a cycle capacity retention (%).

The cycle capacity retention (%) at 60° C. was calculated using Equation 2 above. The results are shown in Table 4 and FIG. 8.

TABLE 4

| | Cycle capacity retention (%) |
|---|---|
| Example 4 | 99 |

Figure 8:
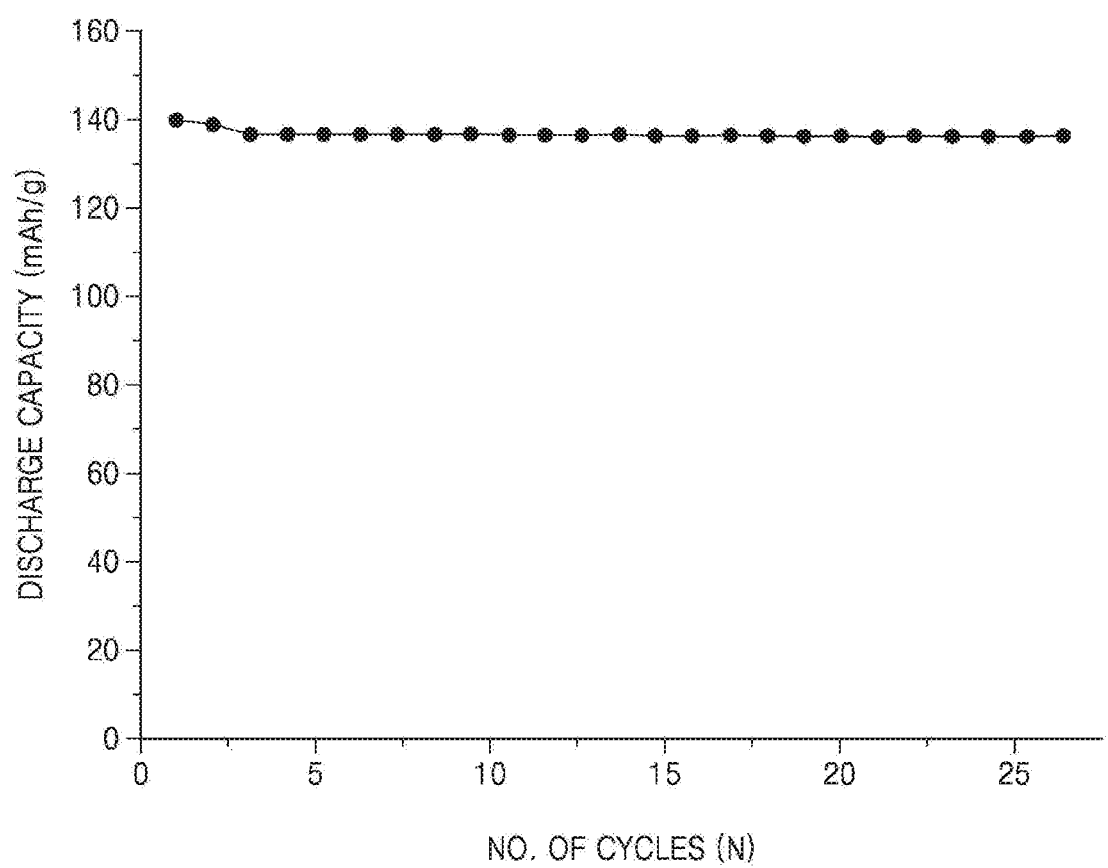
FIG. 8 is a graph of discharge capacity (milliampere-hours per gram, mAh/g) versus number of cycles illustrating lifespan characteristics of the lithium secondary battery prepared according to Example 4, at 60° C. with a charge/discharge voltage of 2.7 V to 4.0 V (vs. Li/Li$^+$) and a current of 0.1 C (0.23 mA/cm$^2$).

Referring to Table 4 and FIG. 8, the lithium secondary battery prepared according to Example 4 has a cycle capacity retention of 99%.

Since the positive electrode for a metal secondary battery according to an embodiment includes a positive active material layer comprising salt comprising an alkali metal salt, an alkaline earth metal salt, or a combination thereof, and the polymeric first binder having the repeating unit represented by Formula 1, the positive active material layer has improved adhesiveness to the positive current collector. Thus, interfacial contact resistance between the positive electrode and the electrolyte may be reduced.

Also, the metal secondary battery including the electrolyte membrane or separator having the polymer having the repeating unit represented by Formula 1 may have improved electrochemical oxidation stability at a high voltage of 4.2 V and improved initial charge/discharge capacity, charge/discharge efficiency, and lifespan characteristics.

It should be understood that embodiments described herein should be considered in a descriptive sense only and not for purposes of limitation. Descriptions of features, aspects, or advantages within each embodiment should typically be considered as available for other similar features, aspects, or advantages in other embodiments.

While an embodiment has been described with reference to the figures, it will be understood by those of ordinary skill in the art that various changes in form and details may be made therein without departing from the spirit and scope as defined by the following claims.

What is claimed is:

1. A positive electrode for a metal secondary battery, the positive electrode comprising
   a positive current collector; and
   a positive active material layer disposed on the positive current collector, wherein the positive active material layer comprises:
   a positive active material,
   a salt comprising an alkali metal salt, an alkaline earth metal salt, or a combination thereof, and
   a polymeric first binder consisting essentially of a repeating unit represented by Formula 1:

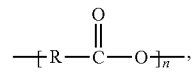

Formula 1 wherein R is a C2-C5 alkylene group substituted with a halogen atom, a methyl group, a C1-C20 alkyl group substituted with a halogen atom, a hydroxyl group, a nitro group, a cyano group, an amino group, an amidino group, a hydrazine group, a hydrazone group, a carboxylic acid group and a salt thereof, a benzylcarboxylic acid group and a salt thereof, a sulfonic acid group and a salt thereof, a phosphoric acid group and a salt thereof, a C2-C20 alkenyl group, a C2-C20 alkynyl group, a C3-C20 cycloalkyl group, a C6-C20 aryl group, a C6-C20 heteroaryl group, a C7-C20 arylalkyl group, or a C6-C20 heteroarylalkyl group,
a C2-C6 alkoxylene group substituted with a halogen atom, a methyl group, a C1-C20 alkyl group substituted with a halogen atom, a hydroxyl group, a nitro group, a cyano group, an amino group, an amidino group, a hydrazine group, a hydrazone group, a carboxylic acid group and a salt thereof, a benzylcarboxylic acid group and a salt thereof, a sulfonic acid group and a salt thereof, a phosphoric acid group and a salt thereof, a C2-C20 alkenyl group, a C2-C20 alkynyl group, a C3-C20 cycloalkyl group, a C6-C20 aryl group, a C6-C20 heteroaryl group, a C7-C20 arylalkyl group, a C6-C20 heteroarylalkyl group, or an unsubstituted C2-C6 alkoxylene group,
a C2-C6 alkoxycarbonylene group substituted with a halogen atom, a methyl group, a C1-C20 alkyl group substituted with a halogen atom, a hydroxyl group, a nitro group, a cyano group, an amino group, an amidino group, a hydrazine group, a hydrazone group, a carboxylic acid group and a salt thereof, a benzylcarboxylic acid group and a salt thereof, a sulfonic acid group and a salt thereof, a phosphoric acid group and a salt thereof, a C2-C20 alkenyl group, a C2-C20 alkynyl group, a C3-C20 cycloalkyl group, a C6-C20 aryl group, a C6-C20 heteroaryl group, a C7-C20 arylalkyl group, a C6-C20 heteroarylalkyl group, or an unsubstituted C2-C6 alkoxycarbonylene group, a C2-C6 alkylene oxide group substituted with a halogen atom, a methyl group, a C1-C20 alkyl group substituted with a halogen atom, a hydroxyl group, a nitro group, a cyano group, an amino group, an amidino group, a hydrazine group, a hydrazone group, a carboxylic acid group and a salt thereof, a benzylcarboxylic acid group and a salt thereof, a sulfonic acid group and a salt thereof, a phosphoric acid group and a salt thereofa C2-C20 alkenyl group, a C2-C20 alkynyl group, a C3-C20 cycloalkyl group, a C6-C20 aryl group, a C6-C20 heteroaryl group, a C7-C20 arylalkyl group, a C6-C20 heteroarylalkyl group, or an unsubstituted C2-C6 alkylene oxide group, or a combination thereof, n is an integer from 90 to 2,700; and wherein an amount of the polymeric first binder is in a range of about 0.1 parts by weight to about 30 parts by weight, based on 100 parts by weight of the positive electrode.

2. The positive electrode for a metal secondary battery of claim 1, wherein R in Formula 1 is a C2-C5 alkylene group substituted with a methyl group, a phenyl group, a benzyl group, or a benzylcarboxyl group.

3. The positive electrode for a metal secondary battery of claim 1, wherein R in Formula 1 comprises a group represented by Formulae 1-6 to 1-8, 1-11-1-13, or a combination thereof:

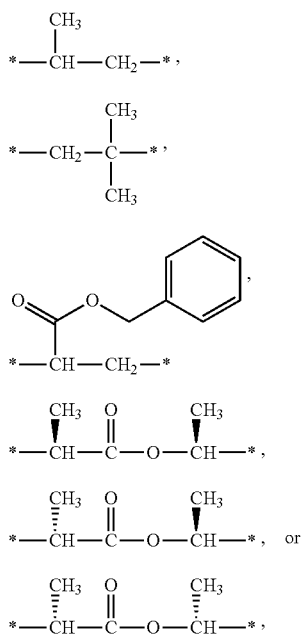

wherein * is a binding site to a main chain of a polymer of the repeating unit represented by Formula 1.

4. The positive electrode for metal secondary battery of claim 1, wherein n in Formula 1 is an integer from 100 to 1,800.

5. The positive electrode for a metal secondary battery of claim 1, wherein the salt comprises LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, LiSbF$_6$, Li(CF$_3$SO$_2$)$_3$C, LiN(SO$_2$C$_2$F$_5$)$_2$, LiPF$_3$(C$_2$F$_5$)$_3$, LiPF$_3$(CF$_3$)$_3$, LiB(C$_2$O$_4$)$_2$, NaSCN, NaSO$_3$CF$_3$, NaN(SO$_2$CF$_3$)$_2$, KN(SO$_2$CF$_3$)$_2$, Ba(N(SO$_2$CF$_3$)$_2$)$_2$, Ca(N(SO$_2$CF$_3$)$_2$)$_2$, or a combination thereof.

6. The positive electrode for a metal secondary battery of claim 1, wherein a weight ratio of the polymeric first binder comprising the repeating unit represented by Formula 1 to the salt is in a range of about 9:1 to about 1:9.

7. The positive electrode for a metal secondary battery of claim 1, wherein a weight ratio of the polymeric first binder comprising the repeating unit represented by Formula 1 to the salt is in a range of about 8:2 to about 5:5.

8. The positive electrode for a metal secondary battery of claim 1, further comprising a second binder, an organic solvent, or a plasticizer, and wherein an amount of the second binder is in a range of about 0.1 parts by weight to about 50 parts by weight, based on 100 parts by weight of the positive electrode.

9. The positive electrode for a metal secondary battery of claim 8, wherein the second binder comprises polyvinylidene difluoride, polyvinyl alcohol, a polyacrylic ester, a vinylidene fluoride-hexafluoro propylene copolymer, chloropolyethylene, a polymethacrylic acid ester, an ethylene-vinylalcohol copolymer, a polyimide, a polyamide, a polyamideimide, a carboxylic acid derivative thereof, or a combination thereof.

10. The positive electrode for a metal secondary battery of claim 8, wherein the organic solvent comprises N-methylpyrrolidone, propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, y-butyrolactone, dioxolane, 4-methyldioxolane, N,N-dimethyl formamide, N,N-dimethylacetamide, dimethylsulfoxide, dioxane, 1,2-dimethoxyethane, sulforane, dichloroethane, chlorobenzene, nitrobenzene, diethylene glycol, dimethyl ether, or a combination thereof.

11. The positive electrode for a metal secondary battery of claim 8, wherein the plasticizer comprises a phthalate plasticizer, a trimellitate plasticizer, a phosphate plasticizer, a polyester plasticizer, a chloride plasticizer, or a combination thereof, and the amount of the plasticizer is in a range of about 0.1 parts by weight to about 50 parts by weight, based on 100 parts by weight of the positive electrode.

12. The positive electrode for a metal secondary battery of claim 1, wherein the positive active material comprises a compound capable of intercalation and deintercalation of lithium, inorganic sulfur, or a sulfur compound.

13. The positive electrode for a metal secondary battery of claim 1, wherein the positive active material layer has a peel strength of about 0.2 kilo-Newtons per meter to about 0.8 kilo-Newtons per meter with respect to the positive current collector.

14. A metal secondary battery comprising:
a negative electrode comprising lithium metal or a lithium alloy;
the positive electrode of claim 1; and
a separator interposed between the negative electrode and the positive electrode.

15. The metal secondary battery of claim 14, wherein the separator comprises:
a porous substrate; and
a polymer electrolyte layer disposed on a surface of the porous substrate, the polymer electrolyte layer comprising alkali metal salt, alkaline earth metal salt, or a combination thereof, and the polymer consisting essentially of the same repeating unit represented by Formula,

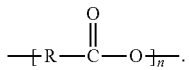

16. The metal secondary battery of claim 15, wherein a weight ratio of the polymer comprising the repeating unit represented by Formula 1 of the separator to the salt is in a range of about 8:2 to about 5:5.

17. The metal secondary battery of claim 15, wherein the polymer electrolyte layer of the separator has an oxidation initiation voltage of about 4.35 Volts to about 4.6 Volts vs. Li/Li$^+$.

18. The metal secondary battery of claim 15, wherein the metal secondary battery has a capacity retention of 80% or greater to a 20$^{th}$ cycle at 60° C. at an operating voltage of about 3.0 Volts to about 4.2 Volts vs. Li/Li'.

19. The metal secondary battery of claim 15, wherein the metal secondary battery has an average coulombic efficiency of 95% or greater to a 20$^{th}$ cycle at 60° C. at an operating voltage of about 3.0 Volts to about 4.2 Volts vs. Li/Li'.

20. The metal secondary battery of claim 14, wherein the separator has a thickness of about 20 micrometers to about 100 micrometers.

21. A method of preparing a positive electrode for a metal secondary battery of claim 1, the method comprising
    providing the positive current collector; and
    disposing the positive active material layer on the positive current collector.

* * * * *